United States Patent [19]

Witzeman et al.

[11] Patent Number: 5,453,464

[45] Date of Patent: Sep. 26, 1995

[54] THERMOSETTING COATING COMPOSITIONS

[75] Inventors: J. Stewart Witzeman, Kingsport; Allen L. Crain, Church Hill, both of Tenn.

[73] Assignee: Eastman Chemical Company, Kingsport, Tenn.

[21] Appl. No.: 234,890

[22] Filed: Apr. 28, 1994

Related U.S. Application Data

[62] Division of Ser. No. 65,386, May 24, 1993, abandoned.

[51] Int. Cl.$^6$ ........................................................ C08L 61/00
[52] U.S. Cl. ........................... 525/153; 560/60; 560/121; 560/123; 560/124; 560/126; 560/174; 560/178; 525/55; 525/437; 428/480; 428/482
[58] Field of Search ............................... 560/60, 121, 123, 560/124, 126, 174, 178; 529/437, 55, 153; 428/480, 482

[56] References Cited

U.S. PATENT DOCUMENTS

| | | | |
|---|---|---|---|
| 4,795,787 | 1/1989 | Walz | 525/328 |
| 5,051,529 | 9/1991 | Witzeman et al. | 560/178 |
| 5,113,011 | 5/1992 | Witzeman et al. | 560/178 |
| 5,206,419 | 4/1993 | Witzeman et al. | 560/176 |
| 5,247,122 | 9/1993 | Witzeman et al. | 560/51 |

FOREIGN PATENT DOCUMENTS

| | | |
|---|---|---|
| 1076133 | 1/1960 | Germany. |
| 92/21646 | 12/1992 | WIPO. |

OTHER PUBLICATIONS

Witzeman et al "Comparison of Methods for the Preparation of Acetoacetylated Coating Resins", vol. 62, No. 789, Oct. 1990.
R. J. Clemens; F. D. Rector; J. Coating, Technol., 61, No. 770, 83 (1989).
F. D. Rector, W. W. Blount, D. R. Leonard, ibid, 61, No. 771, 31 (1989).
J. S. Witzeman, W. D. Nottingham, F. D. Rector; ibid, 62, No. 789, 101 (1990).
J. S. Witzeman; Tetrahedron Letters, 31, 1401, (1990).
D. S. Campbell, C. W. Lawrie; J. Chem. Soc., Chem. Commun., 1971, (355).
Witzeman and Nottingham; Journal of Organic Chemistry, 1991, 56, 1713.
S. M. McElvain, K. H. Weber; Org. Syn. Coll., vol. III, 379, (1955).
R. E. Bowman, W. D. Fordham; J. Chem. Soc., 2758, (1951).
M. W. Rathke, R. J. Cowan; J. Org. Chem., 50, 2622 (1985).
S. K. Wu, G. S. Dai, L. S. Liu, J. K. Chang; Polymer Degradation and Stability, 16, (1986), 169–186.
J. A. Moore, T. D. Mitchell; Polym. Prepr. Am. Chem. Soc. Div. Polym. Chem., 19 (2), 13 (1978).
J. A. Moore, T. D. Mitchell; J. Polymer Sci. Polym. Chem. Ed. 18, 3029 (1980).
J. A. Moore, J. E. Kochanowski; Macromolecules, 8, 121, (1975).
F. Higashi, A. Tai, K. Adachi; J. Polym. Sci., 8, 2563 (1970).
CA 113(19):171207d; CA 101(23):210817b; CA 87(25):200877z; CA 99(16):123053w; CA 98(26):216126s; CA 94(6):31110f.

*Primary Examiner*—Samuel A. Acquah
*Attorney, Agent, or Firm*—Bernard J. Graves, Jr.; Harry J. Gwinnell

[57] ABSTRACT

This invention provides the use and preparation of certain 2,2'-diacetyl-bisacetoacetates and bis(beta-ketoesters). These compounds are useful in coating formulations as crosslinkers in conjunction with polyester, acrylic and/or other hydroxylated resins to provide coatings that cure at about 100° and 175° C. Certain combinations of these crosslinkers and resins cure at unusually low temperatures and provide films with good combinations of flexibility, hardness and adhesion.

7 Claims, No Drawings

THERMOSETTING COATING COMPOSITIONS

This is a divisional application of application Ser. No. 08/065,386 filed on May 24, 1993 now abandoned.

FIELD OF THE INVENTION

This invention belongs to the field of organic chemistry. In particular, it relates to certain diacetyl bisacetoacetates and bis(beta-ketoesters) useful as crosslinkers in thermosetting coating compositions.

BACKGROUND OF THE INVENTION

Polymer crosslinking agents or "crosslinkers" are multifunctional molecules capable of reacting with pendant functional groups on polymers. The use of crosslinkers enables one to increase the molecular weight of the polymer, usually in a second step, and thus improves the properties of the resulting polymer or polymeric film. Most crosslinking reactions are initiated by heating a mixture of the polymer and the crosslinker either neat or in a solvent. Such systems are often referred to as "thermosetting" systems.

Crosslinkers are particularly useful in coating applications due to the fact that the crosslinker enables the use of relatively low molecular weight polymers and resins which are easily handled in solvents. The formulation can subsequently be applied to the substrate and heated, or cured, to give the finished (thermoset) coating. This makes it possible to take advantage of the ease of handling and solubility characteristics of the lower molecular weight resins used in the formulation and subsequently develop the hardness, chemical and solvent resistance, as well as strength/flexibility properties desired in the ultimate coating by the reaction of the crosslinker with the resin during the curing process.

Crosslinkers are becoming increasingly important due to the emphasis on more environmentally acceptable coatings. One major environmental concern in the coatings industry is the amount of organic solvent released during the curing process. This solvent level or Volatile Organic Content (VOC) is of concern due to the role of organic solvents in the development of photochemical smog. For these reasons various governments, including the U.S., are regulating the VOC levels of coating formulations. One way to reduce the amount of solvent necessary in a coating formulation is to reduce the molecular weight of the resin backbone used in the formulation. When this approach is used, how-ever, crosslinking becomes even more critical to the development of the ultimate properties in the cured film. Thus, in these applications the crosslinker enables a more environmentally sound coating formulation.

Properties of Crosslinked Films and Coatings

A number of properties are desired in a coating in order to impart the desired protection of the object from corrosion and other environmental factors. Some of the protective characteristics that are ultimately desired include the resistance of the coating to various chemicals and solvents, the impact strength of the system, the hardness of the coating and the weatherability, or resistance of the system to various factors related to environmental exposure.

I) Chemical and Solvent Resistance

In order for a coating to impart adequate protection to the object coated it must be resistant to various chemicals and solvents. If a coating is not resistant to solvents and chemicals, the coating could be removed or the protective integrity compromised by exposure to commonly used materials such as cleaners or gasoline. Since the coating formulation is usually applied in a solvent, development of solvent resistance in the cured film indicates a change in the chemical nature of the coating formulation. This change can be attributed to the crosslinking of the polymer. A commonly used test to assay this property is the methyl ethyl ketone (MEK) rub resistance of the coating. The MEK rub resistance of a coating is often one of the best diagnostic tests for determining the extent of crosslinking in coatings. For most applications, a MEK rub resistance of greater than 175–200 is generally desired.

II) Impact Strength

In order for a coating to be resistant to collisions and other sudden impacts the material must have certain strength characteristics. If a coating does not possess enough strength, impacts and/or collisions will lead to chipping and breaking of the coating which, in turn, compromises the protective integrity of the film. A commonly used test for the impact strength of a coating (ASTM D2794-84) is to drop a weight from various heights on a coated panel and determine the force(in foot-lbs.) required to break the coating. Proper crosslinking can help develop the impact strength of a coating.

III) Hardness

In order for a coating to be resistant to scratching and other such abrasions the coating must possess a certain degree of hardness. This resistance to scratching is often determined by marring the coating with pencils of various hardness and noting which hardness of pencil actually scratches the coating.

Hardness and impact strength often work in opposite directions. This is due to the fact that impact strength reflects both the strength and the flexibility of the polymeric film, while hardness reflects primarily just the strength or rigidity of the film. Thus one often seeks a combination of hardness and flexibility by compensating one of the above characteristics for the other.

The compensation of these two factors is best understood by invoking the theory of crosslink density. If the coating formulation consists of a group of polyfunctional (n>2) polymer molecules and crosslinker then the crosslinking process can be thought of as consisting of a series of steps. Initially, the crosslinking reaction consists of intermolecular reactions of various polymer chains. During the initial phase the polymer and crosslinker chains are combining and thus building in molecular weight, but, the mobility of the resulting polymer chains is not greatly restricted. This stage would be characterized by improvement in the chemical resistance, hardness and impact strength of the film. At some point, however, intermolecular reaction is essentially complete and intramolecular reaction becomes significant. At this point, the polymer becomes more rigid due to restriction of the polymer chain mobility by these intramolecular reactions and the resulting coating becomes more brittle. At this stage hardness will improve but the impact strength will decrease, due to the increased rigidity of the polymer network.The balance between flexibility and hardness can be controlled by the amount of crosslinker used, the average functionality of the polymer and crosslinker as well as the chemical structure of the polymer or crosslinker.

IV) Resistance to Atmospheric Exposure (Weathering)

Since many coated objects are exposed to severe weather conditions the performance of the coating under various exposure conditions is very important. Factors which effect the weatherability of the coating include the composition of the polymer and the crosslinker, as well as the degree of crosslinking. A variety of exposure tests are available which enable one to determine the performance of the system to severe conditions.

Crosslinkers Currently Used in the Field

A large number of crosslinkers are used in various applications. A partial list of the more commonly used functional groups used in crosslinkers include:

Epoxy Compounds

Isocyanates

Amino resins

Unsaturated compounds

These materials take advantage of the reaction of the aforementioned functional groups with various pendant groups on the polymeric backbone. These cross-linkers can be used in combination with other cross-linkers to impart a variety of desired characteristics to the coatings. The use and reactions of these cross-linkers have been reviewed elsewhere. (See, for example, Labana, S. S., in *"Encyclopedia of Polymer Science and Engineering,* Vol. 4, pp. 350–395.

The use of di-t-butyl-2,2'-bisacetoacetates as coating crosslinkers is described in copending application U.S. Ser. No. 07/709,049, corresponding to published PCT Application No. US92/04701. These materials are unique crosslinkers, but suffer from the fact that they require relatively high cure temperatures to effect crosslinking.

Acetoacetylated polymers have been shown to impart unique properties to various resins and polymers. (See, for example (a) Clemens, R. J.; Rector, F. D.; *J. Coating. Technol.,* 61, No. 770, 83 (1989). (b) Rector, F. D.; Blount, W. W.; Leonard, D. R. ibid, 61, No. 771, 31 (1989). (c) Witzeman, J. S.; Nottingham, W. D.; Rector, F. D.; ibid, 62, No. 789, 101 (1990)). Among the properties noted for these acetoacetylated materials are lowered solution viscosity, improved strength/flexibility balance and the opportunity to carry out traditional as well as novel crosslinking reactions via the acetoacetyl methylene or ketone functional groups.

The reaction of acetoacetates with other nucleophiles (transacetoacetylation) has been studied. (See, for example (a) Witzeman, J. S.; *Tetrahedron Letters,* 31, 1401, (1990) and (b) Campbell, D. S.; Lawrie, C. W.; *J. Chem. Soc, Chem Commun.,* 1971, 355). It has been shown that this reaction proceeds via the intermediacy of acetylketene rather than by a transesterification mechanism.

The use of t-butyl acetoacetate (t-BAA) in the preparation of simple acetoacetates and acetoacetylated polymers is described in U.S. Pat. No. 5,051,529 and in Witzeman and Nottingham, *Journal of Organic Chemistry* 1991, 56, 1713. These studies demonstrated that t-BAA is the reagent of choice for acetoacetylation due to its rapid rate of reaction and excellent yields.

Monofunctional 2-acetyl-ketoesters are well known in organic chemistry. (See, for example (a) McElvain, S. M.; Weber, K. H.; *Org. Syn Coll. Vol. III,* 379, (1955); (b) Bowman, R. E.; Fordham, W. D.; *J. Chem. Soc.,* 2758, (1951); and (c) Rathke, M. W.; Cowan, P. J.; *J. Org. Chem.,* 50, 2622 (1985)). Difunctional acetyl-ketoesters are much less common. The only disclosure of these types of difunctional materials that we are aware of is discussed in German Patent 1,076,133 (Feb. 25, 1960). This material is prepared by reaction of the ethoxy magnesium complex of beta ketoesters with acid chlorides. In general, these acetyl ketoesters have been used as synthetic intermediates for the preparation of functionalized beta ketoesters. This transformation is accomplished by the basic hydrolysis of the 2-acetyl-ketoester. These materials can also be used to prepare functionalized acetylketones by acid hydrolysis. We know of no examples of compounds of the general formula I as described below being used as crosslinkers or polymer intermediates.

U.S. Pat. No. 4,795,787 describes the use of the adducts from Michael Reaction of acetoacetates (i.e. methyl acetoacetate, ethyl acetoacetate and 2-ethylhexyl acetoacetate) or cyanoacetates as crosslinkers in conjunction with amino containing polymers electro-deposition coatings. The chemical nature and composition of these coatings is distinctly different from that of coatings described herein. The temperatures necessary to cure the formulations described in the above patent are also substantially higher than those provided by the present invention.

Diethyl terephthaloyl acetate, which is a bis(acetoacetate), has been used as a photostabilizer in polymers. (See Wu, S. K., Dai, G. S., Liu, L. S., Chang, J.-K.; *Polymer Degradation and Stability* 16 (1986), 169–186). This compound and other similar bis (beta ketoesters) have been used in conjunction with polyamines to produce polyenaminoester and/or poly-(hydroxy-pyrido-quinoline) polymers-.(See (a) Moore, J. A., Mitchell, T. D.; *Polym. Prepr. Am. Chem. Soc. Div. Polym. Chem.,* 19 (2), 13 (1978). (b) Moore, J. A.; Mitchell, T. D.; *J. Polymer Sci. Polym. Chem. Ed.*, 18, 3029 (1980). (c) Moore, J. A.; Kochanowski, J. E.; *Macromolecules,* 8, 121 (1975). (d) Higashi, F., Tai, A., Adachi, K.; *J. Polym. Sci.,* 8, 2563, (1970)). This is a distinctly different reaction from the crosslinking reactions involved in the compositions provided by the present invention.

SUMMARY OF THE INVENTION

This invention provides certain 2,2'-diacylbisacetoacetates and bis(beta-ketoesters). These materials are useful as crosslinkers in thermosetting coating compositions; in conjunction with polyester, acrylic and/or other hydroxylated resins the crosslinkers provide coatings that cure at or between 100° and 175° C. Certain combinations of these crosslinkers and resins cure at unusually low temperatures and provide films with unique combinations of flexibility, hardness and adhesion.

DETAILED DESCRIPTION OF THE INVENTION

The present invention provides compounds of the formula

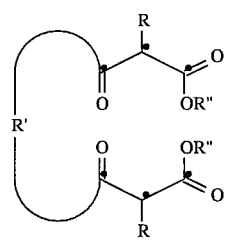

wherein R is hydrogen, acetyl, or a group of the formula

R'''C(O)—, wherein R''' is $C_2$–$C_6$ alkyl, $C_3$–$C_8$ cycloakyl, or phenyl;

R' is aryl, $C_2$–$C_{20}$ alkyl, or a group of the formula —$CH_2$—aryl—$CH_2$—; and R'' is $C_1$–$C_{10}$ alkyl; provided that when R' is phenyl and R is hydrogen, R'' is other than ethyl.

The compounds of formula (I) above are useful as crosslinkers in thermosetting coating compositions. Accordingly, as a further aspect of the present invention, there is provided a thermosetting coating composition comprising (a) about 95 to about 55 weight percent, based on the total weight of (a) and (b), of one or more curable polymers;

(b) about 5 to about 45 weight percent, based on the total weight of (a) and (b), of a compound of the formula

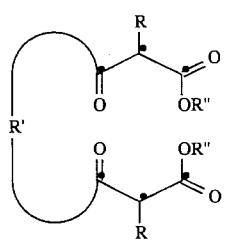

wherein R is hydrogen, acetyl, or a group of the formula R'''C(O)—, wherein R''' is $C_2$–$C_6$ alkyl, $C_3$–$C_8$ cycloakyl, or phenyl;

R' is aryl, $C_2$–$C_{20}$ alkyl, or a group of the formula —$CH_2$—aryl—$CH_2$—; and R'' is $C_1$–$C_{10}$ alkyl; and (c) about 0 to about 50 weight percent, based on the total weight of (a) and (b), of a solvent.

In a preferred embodiment of this aspect of the invention, there is provided a thermosetting coating composition comprising (a) about 95 to about 55 weight percent, based on the total weight of (a) and (b), of a curable polyester having a hydroxyl number of about 15 to about 200 KOH/g, a number average molecular weight of about 300 to about 5000, a weight average molecular weight of about 300 to about 250,000, and an inherent viscosity of about 0.05 to about 1 dL/g as determined in a 60/40 (weight/weight) solution of phenol/tetra-chloroethane at 25° C.;

(b) about 5 to about 45 weight percent, based on the total weight of (a) and (b), of a compound of the formula

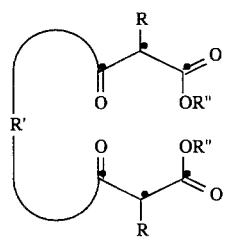

wherein R is hydrogen, acetyl, or a group of the formula R'''C(O)—, wherein R''' is $C_2$–$C_6$ alkyl, $C_3$–$C_8$ cycloakyl, or phenyl;

R' is aryl, $C_2$–$C_{20}$ alkyl, or a group of the formula —$CH_2$—aryl—$CH_2$—; and R'' is $C_1$–$C_{10}$ alkyl; and (c) about 0 to about 50 weight percent, based on the total weight of (a) and (b), of a solvent.

While the above compound of formula (I) has been depicted as its keto tautomer, it should be appreciated that this structure is intended to also encompass the corresponding enol tautomers. In an especially preferred embodiment of the present invention, there is provided compounds of formula (I) having the formula

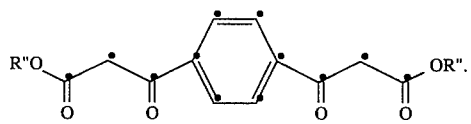

Compounds of formula (I) can be prepared by reaction of the corresponding acid chloride with the appropriate acetoacetate. This process can be accomplished either by use of aqueous hydroxide or the reaction of the acetoacetate with sodium hydride under anhydrous conditions. It has been found that either of these conditions will work when an aromatic acid chloride is involved, but that Method B as referred to in the Experimental Section below is the procedure of choice for aliphatic acid chlorides. It is believed that these materials can be prepared from a variety of routes by those knowledgeable in the field of Organic Chemistry.

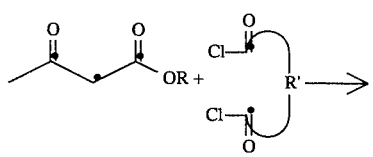

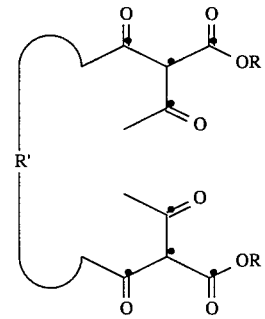

Examples of compounds of formula (I) can be found in Table 1 below.

TABLE 1

Structures of Materials With General Structure I Covered in Specific Examples

| Compound # | R | R' | IUPAC Name |
|---|---|---|---|
| Ia | t-Bu | p-Ph | di(1,1-dimethylethyl) α,α'-diacetyl-β,β' dioxo-1,4-benzendipropionate |
| Ib | Et | p-Ph | diethyl-α,α'-diacetyl-β,β'-dioxo-1,4-benzenedipropionate |
| Ic | n-Bu | p-Ph | dibutyl-α,α'-diacetyl-β,β'-dioxo-1,4-benzenedipropionate |
| Id | t-Bu | i-Ph | di(1,1-dimethylethyl) |

TABLE 1-continued

Structures of Materials With General Structure I Covered in Specific Examples

| Compound # | R | R' | IUPAC Name |
|---|---|---|---|
| Ie | Et | i-Ph | α,α'-diacetyl-β,β'-dioxo-1,3-benzendipropionate diethyl-α,α'-diacetyl-β,β'-dioxo-1,3-benzendipropionate |
| If | t-Bu | $C_2H_4$ | di(1,1-dimethylethyl)-2,7-diacetyl-3,6-dioxooctanedioate |
| Ig | Et | $C_2H_4$ | diethyl-2,7-diacetyl-3,6-dioxooctanedioate |
| Ih | t-Bu | $C_4H_8$ | di(1,1-dimethylethyl)-2,9-diacetyl-3,8-ecanedioate |
| Ii | Et | $C_4H_8$ | diethyl-2,9-diacetyl-3,8-dioxodecanedioate |

These materials can be prepared by basic hydrolysis of the corresponding diacetylbisacetoacetate, by condensation of the appropriate ester anion with bis acid chlorides, bis esters or their equivalents, from reaction of Meldrum's acid with acid chlorides and from other condensation routes well known to those knowledgeable in the field of organic chemistry.

The curable polyester component (a) can be prepared by condensation polymerization methods known per se in the art. The most preferred method is to melt all reactants in a suitably sized reactor, heat the reactants to initiate the reaction and continue processing until the desired molecular weight is reached. Reaction is evidenced by the collection of water (direct condensation) or alcohol (ester inter-change). This procedure is referred to as fusion processing and can be conducted at atmospheric pressure or under vacuum. No modifications in these standard procedures are required for preparing suitable polymers for component (a), above.

In such curable polyesters, suitable diol and/or polyol residues are preferably selected from residues of ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol, 1,6-hexanediol, 2,2,4-trimethyl-1,3-pentanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; diethylene glycol, triethylene glycol; tetraethylene glycol; and pentaethylene, hexaethylene, heptaethylene, octaethylene, nonaethylene, and decaethylene glycols.

Further, preferably the carboxylic acid residues of the curable polyesters are selected from residues of oxalic, malonic, dimethylmalonic; succinic; glutaric; adipic; trimethyladipic; pimelic, 2,2-dimethylglutaric; azelaic; sebacic; fumaric; maleic; itaconic; 1,3-cyclopentanedicarboxylic; 1,2-cyclohexanedicarboxylic; 1,3-cyclohexanedicarboxylic; 1,4-cyclohexanedicarboxylic; phthalic; terephthalic; isophthalic; 2,5-norbornanedicarboxylic; 1,4-naphthalic; diphenic; 4,4'-oxydibenzoic, diglycolic; thiodipropionic; 4,4'-sulfonyldibenzoic; and 2,6-naphthalenedicarboxylic acids.

Examples of commerically-available curable polyesters (component (a)) include Cargill 5770, Cargill 5722, and Aroplaz 6455 (Spencer Kellogg). In general, such polyesters will have hydroxyl values of about 20 to 200 (mg KOH/g polymer).

The acrylic polymer component (a) is preferably a polymer or resin prepared by polymerization of a hydroxyl-bearing monomer such as hydroxyethyl methacrylate, hydroxyethyl acrylate, hydroxyhexyl acrylate, hydroxyhexyl methacrylate, hydroxypropyl acrylate, hydroxypropyl methacrylate, hydroxybutyl acrylate, hydroxylbutyl methacrylate and the like optionally polymerized with other monomers such as methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, styrene, vinyl acetate, and the like. The ratio of reagents and molecular weights of the resulting acrylic polymer are preferably chosen so as to give polymers with an average functionality (the number of OH groups per molecule) greater than or equal to 2, preferably greater than or equal to 4.

Examples of commercially-available curable acrylic polymers include Joncryl 800, Joncryl 500, and Neocryl LE-800.

Suitable solvents for the curable enamel composition (component (b)) include ketones, (for example, methyl amyl ketone); glycol ethers such as 2-butoxyethanol; glycol ether esters such as ethyl-3-ethoxypropionate(EEP) and methoxy propyl acetate; toluene; ester solvents such as ethyl acetate, butyl acetate, propyl acetate, and the like; alcohols such as butanol; 1-methyl-2-pyrrolidinone; xylenes; and other volatile inert solvents typically used in industrial baking (i.e., thermosetting) enamels.

The term "aryl" as used herein refers to heterocyclic aryl rings and carbocyclic aryl rings. For example, aryl can be phenyl, naphthyl, phenanthryl, and the like. Aryl can also be 5 or 6-membered heterocyclic aryl rings containing one oxygen atom, and/or one sulfur atom, and up to three nitrogen atoms, said heterocyclic aryl ring optionally fused to one or two phenyl rings. Examples of such ring systems include thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo, pyridazinyl and purinyl, benzoxazolyl, benzothiazolyl, benzimidazolyl, indolyl and the like.

As a further aspect of the present invention, there is provided a curable enamel composition further comprising one or more cross-linking catalysts, for example, dibutyl tin dilaurate; stearic acid; butyl stannoic acid; dibutyl tin oxide; zinc acetylacetonate; and 1,3-diacetoxy-1,1,3,3-tetrabutyldistannoxane.

As a further aspect of the present invention there is provided a cross-linkable enamel composition as described above, further comprising one or more leveling, rheology, and flow control agents such as silicones, fluorocarbons or cellulosics; flatting agents; pigment wetting and dispersing agents and surfactants; ultraviolet (UV) absorbers; UV light stabilizers; tinting pigments; defoaming and anti-foaming agents; anti-settling, anti-sag and bodying agents; anti-skinning agents; anti-flooding and anti-floating agents; fungicides and mildewicides; corrosion inhibitors; thickening agents; or coalescing agents.

Specific examples of such additives can be found in *Raw Materials Index,* published by the National Paint & Coatings Association, 1500 Rhode Island Avenue, N.W., Washington, D.C. 20005.

Examples of flatting agents include synthetic silica, available from the Davison Chemical Division of W. R. Grace & Company under the tradename Syloid®; polypropylene, available from Hercules Inc., under the tradename Hercoflat®; synthetic silicate, available from J. M. Huber Corporation under the tradename Zeolex®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-oxtadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie U.S.A. under the tradename Anti Terra®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the tradename Brubreak of Buckman Laboratories Inc., under the Byk® tradename of BYK Chemie, U.S.A., under the Foamaster® and Nopco® tradenames of Henkel Corp./Coating Chemicals, under the Drewplus® tradename of the Drew Industrial Division of Ashland Chemical Company, under the Troysol® and Troykyd® tradenames of Troy Chemical Corporation, and under the SAG® tradename of Union Carbide Corporation.

Examples of fungicides, mildewicides, and biocides include 4,4-dimethyloxazolidine, 3,4,4-trimethyloxazolidine, modified barium metaborate, potassium N-hydroxymethyl-N-methyldithiocarbamate, 2-(thiocyanomethylthio) benzothiazole, potassium dimethyl dithio-carbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphtnenate, copper octoate, organic arsenic, tributyl tin oxide, zinc naphthenate, and copper 8-quinolinate.

Examples of U.V. absorbers and U.V. light stabilizers include substituted benzophenone, substituted benzotriazoles, hindered amines, and hindered benzoates, available from American Cyanamide Company under the tradename Cyasorb UV, and diethyl-3-acetyl-4-hydroxy-benzyl-phosphonate, 4-dodecyloxy-2hydroxy benzophenone, and resorcinol monobenzoate.

Such paint or coating additives as described above form a relatively minor proportion of the enamel composition, preferably about 0.05 weight % to about 5.00 weight %.

As a further aspect of the present invention, there is provided a curable enamel composition optionally containing one or more of the above-described additives.

As a further aspect of the present invention, there is provided the above enamel composition further comprising one or more other crosslinking agents. Typical crosslinking agents useful in this context include various melamine-type crosslinking agents, i.e., crosslinking agents having a plurality of N-CH$_2$OR groups with R=C$_1$-C$_8$ alkyl. In this regard, preferred melamine-type crosslinking agents include hexamethoxy methylolmelamine, hexabutoxymethylolmelamine, and various hexaalkoxymethylol melamines in which the alkoxy group can be C$_1$-C$_8$ alkyl and mixtures thereof. Also included are tetramethoxymethylolbenzoguanamine, tetramethoxymethylol urea and the corresponding hexaalkoxy-methylol derivatives.

Other crosslinkers which can be used in conjunction with the compounds of the invention include various aliphatic and aromatic polyisocyanates such as isophorone diisocyanate, tetramethyl xylylene diisocyanate, hexamethylene diisocyanate, methylene-bis-(4,4'-cyclohexylisocyanate), toluene diisocyanate, methylene-bis(4,4'-phenyl isocyanate) and the like. The above isocyanates can be used in either the blocked or unblocked forms and can be derivitized in a number of fashions. These derivitized isocyanates include isocyanurates, biurets, allophanates, and uritidine diones.

(See, for example, J K Backus in "High Polymers" Vol. 29, 1977, p. 642–680).

As a further aspect of the present invention, there is provided a curable enamel composition as set forth above, further comprising one or more pigments in a concentration of about 1 to about 70 weight percent, preferably about 30 to about 60 weight percent, based on the total weight of components (a) and (b) of the composition.

Pigments suitable for use in the enamel compositions envisioned by the present invention are the typical organic and inorganic pigments, well-known to one of ordinary skill in the art of surface coatings, especially those set forth by the *Colour Index*, 3d Ed., 2d Rev., 1982, published by the Society of Dyers and Colourists in association with the American Association of Textile Chemists and Colorists. Examples include, but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1.

Upon formulation above, the curable enamel compositions is then applied to the desired substrate or article, e.g., steel, aluminum, or galvanized sheeting (either primed or unprimed), heated (i.e., cured) to a temperature of about 140° C. to about 275° C., for a time period of 1–120 minutes and subsequently allowed to cool. Thus, as a further aspect of the present invention, there is provided a shaped or formed article which has been coated with the thermosetting coating compositions of the present invention and cured.

Further examples of typical application and curing methods can be found in U.S. Pat. Nos. 4,737,551 and 4,698,391, incorporated herein by reference.

As a further aspect of the present invention, there is provided a coating which results from the application and curing of the curable enamel composition as set forth above.

The coating composition can use the crosslinker systems of this invention either by themselves or in combination with other crosslinkers such as melamines, isocyanates and epoxies. The resulting formulation can be applied to plastic, metal, wood or other such objects. The formulation is crosslinked, or cured, by heating the coated object at 100°–200° C. for 1 min to 2 hrs with 110°–160° C. for 5–45 min being preferred.

Experimental Section $^1$H and $^{13}$C NMR spectra were obtained on a Varian Model Gemini 300 in CDCl$_3$ at frequencies of 300 and 75 MHz respectively. Carbon multiplicities, when given, were determined by the DEPT pulse sequence. (See, for example, Doddrell, D. M.; Pegg, D. T.; Bendall, M. R.; *J. Magn. Reson.* 48, 323, (1982).) Mass spectra were obtained on either a VG ZAB or 7070VSEQ. High resolution CI mass spectra (HR-CIMS) were obtained according to the method of Haddon et al., Proceedings of 36th ASMS Conf. June 5–8, (1988), 1396.

The applicable test procedures are as follows:
1. Testing Coated Metal Specimens at 100 Percent Relative Humidity—Cleveland Humidity test (ASTM Method D 2247)
2. Ford Cup Viscosity (ASTM Method D 1200)
3. Film Thickness (General Electric Gage, Type B)
4. Film Hardness (Pencil Method, ASTM 3363-74, Reapproved 1980)
5. Solvent Resistance (methylethyl ketone (MEK) dynamic rub test, ASTM Method D 1308)
6. Impact Resistance (ASTM Method D 2794-84)
7. Resin molecular weight-GPC
8. OH Value determined by titration and are in units of mg KOH consumed per gram of polymer.
9. Acid Number (ASTM Method D 465). The units of this value are same as the OH value.

Method of Preparation of Diacetyl Bisacetoacetates

METHOD A

This method consisted of reacting the appropriate acetoacetate dissolved in toluene with NaOH in distilled water to form the acetoacetate anion at a temperature below 10° C. The corresponding acid chloride was either dissolved or dispersed in toluene and added dropwise, again keeping the temperature below 10° C. during the addition [EXOTHERMIC REACTION]. When approximately one-half of the chloride solution had been added, a co-addition of another equivalent of base was started. The reaction was allowed to warm from 0° C. to room temperature over approximatily four hours. The reaction was subsequently acidified with 1 or 3M HCl to a pH of 4–5. The resulting crude product was extracted with ethyl acetate/water the layers separated and the resulting organic layer dried over anhydrous $MgSO_4$, filtered, and concentrated by in vacuo.

METHOD B

This method consisted of dissolving the appropriate acetoacetate in THF and cooling to 0° to −10° C. NaH was added in portions at such a rate as to keep the reaction temperature below 5° C. The reaction was typically allowed to stir for approximatly 1–2 hours after completion of the NaH addition. The appropriate acid chloride was dissolved in THF and added dropwise to the reaction [EXOTHERMIC REACTION]. The reaction was stirred overnight. The crude reaction mixture was cooled to 0° to −10° C., and neutralized by addition of 1M HCl to a pH of 4 to 5.5. The resulting crude product was extracted with toluene/ethyl acetate, the organic layer dried with anhydrous $MgSO_4$, filtered and concentrated in vacuo.

The following acetoacetate crosslinkers were prepared by either method A or B as indicated in the abbreviated format.

TEREPHTHALOYL/(t-butyl acetoacetate) (tBAA) (Ia)

Method A from 67.7 g (1.69 mol) NaOH in 200 ml distilled water, 259.1 g (1.64 mol) t-BAA in 500 ml toluene, 159.1 g (0.78 mol) terephthaloyl chloride in 500 ml toluene, and 64.4 g (1.61 mol) NaOH in 100 ml distilled water. Yield: 261.5 g (75.1%), mp 94°–96° C. $^1$H NMR ($CDCl_3$): δ17.02(s,1H), 17.01(s,1H), 13.55(s,1H), 3.52(S,1H), 7.62–7.83(m,2H), 7.57–7.60(m,2H), 2.40(s,3H), 2.10(s,3H), 1.29,1.27,1.20(s's,18H). $^{13}$C NMR ($CDCl_3$): δ195.07, 194.01, 180.86,180.71, 171.35, 171.30, 167.00 143.19, 142.50, 141.18, 140.45, 129.02, 128.84, 128.02, 127.87, 111.33, 111.19, 106.64, 83.73, 83.60, 82.44, 82.40, 28.36, 28.33, 28.25, 28.19, 25.15, 25.06, 20.80. IR ($CH_2Cl_2$ film): 2990, 1730, 1669, 1650, 1598, 1395, 1370, 1260, 1165 cm$^{-1}$. HR-CIMS 464.2253 (Calcd for $C_{24}H_{28}O_8+NH_4+$: 464.2284). Anal. Calcd for $C_{24}H_{30}O_8$: C, 64.55; H, 6.79. Found: C, 64.30; H, 6.79%.

TEREPHTHALOYL/Ethyl acetoacetate (EAA) (Ib)

Method A from 44.6 g NaOH in 120ml distilled water, 169.6 g (1.07 mol) EAA in 200ml toluene, 104.7 g (0.51 mol) terephthaloyl chloride in 350 ml toluene, and 42.4 g NaOH in 100 ml distilled water. Yield: 188.1 g (94.1%), mp 104°–105° C. $^1$H NMR ($CDCl_3$): δ17.16 (s, 2H), 17.15 (s, 2H), 13.39(s,2H), 13.35(s,2H), 7.81–7.84(m,2H), 7.56–7.59(m,2H), 3.94–4.02(m,J=7.21Hz,4H), 2.43, 2.42(s's,6H), 2.11,2.09(s's,6H), 0.94–0.98(m,6H). IR ($CH_2Cl_2$ film): 2995, 1718, 1650, 1590, 1405, 1385, 1270, 1245, 1148, 1073, 1019cm$^{-1}$. HR-CIMS 391.1368 (Calcd for $C_{20}H_{22}O_8+H+$:391.1393) 408.1640 (Calcd for $C_{20}H_{22}O_8+NH_4+$: 408.1658). Anal. Calcd for $C_{20}H_{22}O_8$: C, 61.52; H,5.69%. Found: C, 61.16; H, 5.74%.

TEREPHTHALOYL/n-butyl acetoacetate (nBAA) (Ic)

Method A from 20.5 g NaOH in 50 mL distilled water, 80.2 g (0.507 mol) nBAA in 100 mL toluene with an additional 200 mL toluene added to aid dispersion, 50.3 g (0.248 mol) terephthaloyl chloride in 180 mL toluene and 19 g NaOH in 50 mL water to give 66.4 g (60 %) 1c. $^1$H NMR: 17.16, 17.14, 13.40, 13.37 (s's, 2H total), 7.83 (d, J=7.76 Hz, 2H), 7.58 (d, J=8.53 Hz, 2H), 4.03 (t, J=6.34 Hz), 3.92 (t, J=6.70 Hz) (2 H total), 2.428, 2.09 (s's, 6H total), 1.22–1.35 (m, 4H), 0.89–1.07 (m, 4H), 0.65–0.81 (m, 6H) ppm. IR 2959, 2935, 2875, 1715, 1655, 1591, 1403, 1271, 1245, 1145, 1073 cm$^{-1}$. HR-CIMS: 464.2265 (Calc'd for $C_{24}H_{30}O_8+NH_4++$464.2284)

ISOPHTHALOYL/tBAA (Id)

Method A from 44.0 g NaOH in 100 ml distilled water, 174.02 g (1.10 mol) tBAA in 250 ml toluene, 100.0 g (0.49 mol) isophthaloyl chloride in 250 ml toluene, and 40.0 g NaOH in 100 ml distilled water. Recrystalized in acetone/water- Yield: 77.3 g (35.1%), mp 102°–103° C. $^1$H NMR ($CDCl_3$): δ17.04(s,1H), 16.97(s,1H), 13.65(s,1H), 13.60(s, 1H), 7.87–7.94(m,4H), 7.68–7.71(m,2H), 7.45–7.50(m, 2H), 2.39(s,3H), 2.10(s,3H), 1.26(s,3H), 1.17(s,18H) $^{13}$C NMR ($CDCl_3$): δ194.91, 193.67, 190.15, 181.44, 181.06, 171.37, 171.32, 166.92, 140.44, 140.34, 138.01, 132.78, 131.65, 131.53, 130.58, 129.19, 128,68, 128.60, 128.54, 128,19, 111.04, 106.53, 83.62, 83.42, 82.26, 82.21, 28.28, 28.24, 28.12, 25.02, 24.92, 20.77. IR ($CH_2Cl_2$ film): 2994, 2940, 1716, 1670, 1650, 1607, 1460, 1430, 1397, 1372, 1280, 1260, 1163, 1123, 1075 cm$^{-1}$. HR-CIMS 464.2242 (Calcd for $C_{24}H_{30}O_8+NH_4+$: 464.2284)- Anal. Calcd for $C_{24}H_{30}O_8$: C, 64.55; H, 6.79. Found: C, 64.27; H, 6.94%.

ISOPHTHALOYL/EAA (Ie)

Method A from 33 g NaOH in 50 mL distilled water, 107.66 g (0.828 mol) EAA in 60 mL toluene with 230 mL toluene added subsequently to aid dispersion, 77.9 g isophthaloyl chloride (0.384 mol) in 100 mL toluene, and 30 g NaOH in 70 mL distilled water. $^1$H NMR: 17.23, 17.18, 13.43, 13.40, (s's, 2 H total), 8.01–7.88 (m, 2H), 7.75–7.39 (m, 2H), 7.28–7.11 (m, 1H), 4.12–3.92 (m, 4H), 2.28, 2.11, 2.10, (s's, 6H total), 1.00–0.85 (m, 3H). IR: 2979, 2923, 2890, 1716, 1664, 1645, 1601, 1400, 1242, 1069 cm$^{-1}$. HR-CIMS: 390.1313 (Calc'd for $C_{20}H_{22}O_8$ 390.1314), 408.1671 (Calc'd for $C_{20}H_{22}O_8$+NH$_4$+: 408.1658)

SUCCINYL/tBAA (If)

Method A from 56.0 g NaOH in 120 ml distilled water, 221.48 g (1.40 mol) tBAA in 200 ml toluene, 100.0 g (0.645 mol) succinyl chloride in 300 ml toluene, and 50.0 g NaOH in 100 ml distilled water. Recrystalized in acetone/water. Yield: 61.8 g (24.0%), mp 100°–102° C. $^1$H NMR (CDCl$_3$): δ17.42(s,2H), 3.05(s,4H), 2.31(s,6H), 1.54(s,18H). $^{13}$C NMR (CDCl$_3$): δ198.73(C), 193.16(C), 166.87(C), 110.75(CH), 82.24(C), 33.61(CH$_2$), 28.77(CH$_3$), 25.13(CH$_3$). IR (CH$_2$Cl$_2$ film): 3400, 2985, 2950, 1717, 1590, 1410, 1400, 1370, 1325, 1265, 1190, 1095, 1040 cm$^{-1}$. HR-CIMS 416.2261 (Calcd for $C_{20}H_{30}O_8$+NH$_4$+: 416.2284). Anal. Calcd for $C_{20}H_{30}O_8$: C, 60.28; H, 7.60%. Found: C, 60.04; H, 7.81%.

SUCCINYL/EAA (Ig)

Method B from 93.70 g (0.72 mol) EAA in 550 ml THF, 58.0 g (2.42 mol) NaH [60% in mineral oil], and 54.24 g (0.35 mol) succinyl chloride in 100ml THF. Crystals filtered and washed with heptane. Yield: 56.7 g (47.3%). $^1$H NMR (CDCl$_3$): 67 17.71(s,2H), 4.24–4.31(m,J=7.1Hz,4H), 3.09(s, 4H), 2.34(s,6H), 1.31–1.35(t,J=7.1Hz,6H). $^{13}$C NMR (CDCl$_3$): 67 199.73(C), 194.39(c), 167.51(C), 10S.96(CH), 61.34 (CH$_2$), 33.89 (CH$_2$), 25.49 (CH$_3$), 14.75 (CH$_3$). IR (acetone cast film): 3400, 2980, 1710, 1575, 1410, 1370, 1290, 1238, 1082, 1023 cm$^{-1}$. HR-CIMS 343.1418 (Calcd for $C_{16}H_{22}O_8$+H+: 343.1393), 360. 1680 (Calcd for $C_{16}H_{22}O_8$+NH$_4$+: 360.1658).

ADIPYL/tBAA (Ih)

Method B from 118.65 g (0.75 mol) tBAA in 600 ml THF, 62.0 g (2.58 mol) NaH [60% in mineral oil], and 65.89 g (0.36 mol) adipyl chloride in 120 ml THF. $^1$H NMR (CDCl$_3$): δ17.47(s, 2H), 2.63(m,4H), 1.69(m,4H), 1.53(s, 6H), 1.25(s,18H). $^{13}$C NMR (CDCl$_3$): δ197.14(C), 194.42(C), 166.47(C), 110.45(CH), 81.52(C), 50.56(CH$_2$), 42.45(CH$_2$), 28.10 (CH$_3$), 25.28 (CH$_3$). IR (neat): 2975, 2925, 1710, 1590, 1460, 1413, 1393, 1370, 1252, 1168, 1088 cm$^{-1}$. HR-CIMS 427.2361 (Calcd for $C_{22}H_{34}O_8$+H+: 427.2332) 444.2632 (Calcd for $C_{22}H_{34}O_8$+NH$_4$+: 444.2597).

ADIPYL/EAA (Ii)

Method A from 71.20 g NaOH in 120 ml distilled water, 217.33 g (1.67 mol) EAA in 200 ml toluene, 148.25 g (0.81 mol) adipyl chloride in 200 ml toluene, and 68.80 g NaOH in 100 ml distilled water. $^1$H NMR (CDCl$_3$): δ17.79(s,2H), 4.25(m,J=6.9Hz,4H), 2.68(s,4H), 2.33(s,6H), 1.67(s,4H), 1.33(t,J=6.9Hz,6H). IR (smear): 2980, 2938, 1712, 1560, 1448, 1417, 1370, 1300, 1237, 1084, 1029 cm$^{-1}$. HR-CIMS 371. 1706 (Calcd for $C_{18}H_{26}O_8$+H+: 371. 1706), 388. 1979 (Calcd for $C_{18}H_{26}O_8$+NH$_4$+: 388.1971).

TEREPHTHALOYL BIS(ACETIC ACID ETHYL ESTER): (IIb)

This material is used as a chemical intermediate in the preparation of a material for use in photographic products. It can be prepared by a method similar to that described in Example 3 (see below).

$^1$H NMR: 12.55(s, 2H), 7.82 (s, 4H), 5.71 (s, 2H), 4.24–4.31 (m, J=7.0 Hz, 4H), 4.01 (s, 4H), 1.23–1.29 (t, J=7.25Hz, 6H). 82%/18% enol/keto forms.

COATING EVALUATIONS

The following resins were used in the evaluations:

Resin A: A polyester resin prepared from 36.79% neopentyl glycol (NPG), 7.26% trimethylol propane (TMP), 9.79% isophthalic acid (IPA), and 26.20% adipic acid (AD). The material had an equivalent weight of 544.7 and a hydroxyl value of 105.

Resin B: A polyester resin prepared from 29.79% NPG, 14.39% TMP, 29.70% IPA, and 26.12% AD. The material had an equivalent weight of 637, a hydroxyl value of 88.06, Mn of 2573, and a Mw of 10,294.

Resin C: A polyester resin prepared from 42.93% cyclohexanedimethanol (CHDM), 8.29% TMP, 17.32% 1,4-cyclohexanedicarboxylic acid (CHDA), 14.70% AD, and 16.77% IPA. This material had an equivalent weight of 497.2, a hydroxyl value of 112.85, Mn of 2354, and a Mw of 6136.

Resin D: A polyester resin prepared from 12.51% TMP, 35.80% 1,4-CHDA, 30.85% NPG, and 20.85% phthalic acid (PA). This material had an equivalent weight of 516, a hydroxyl value of 104.06, Mn of 4308, and a Mw of 12,162.

Resin E: This material was an acrylic resin prepared from 20 mol % hydroxyethyl methacrylate and 80 mol % methyl methacrylate and had a hydroxyl value of 106. The resin was used as a 60% solids solution in EEP.

Various solvents were used in the formulations tested. The type of solvent used is indicated by a superscripted number following the amount of solvent used. This number corresponds to the solvent system (see Table 2).

TABLE 2

| | Solvent System Key |
|---|---|
| 1 | 30 ml 70/15/15 methyl amyl ketone (MAK)/ethoxy ethyl propionate (EEP)/n-butyl alcohol (BuOH) + 10 ml EEP |
| 2 | 50 ml cyclohexanone + 15 ml 1-methyl-2-pyrrolidinone |
| 3 | 15 ml diethylene glycol ethyl ether acetate (DE Acetate) + 7 ml 1-methyl-2-pyrrolidinone |
| 4 | 35 ml cyclohexanone + 10 ml methyl ethyl ketone (MEK) + 10 ml mixed xylenes |
| 5 | cyclohexanone |
| 6 | 50/50 MAK/EEP |
| 7 | 50/30/20 MEK/EEP/MAK |
| 8 | 50 ml 1-methyl-2-pyrrolidinone + 10 ml 50/50 MAK/EEP |
| 9 | 15 ml 50/30/20 MEK/EEP/MAK + 20 ml cyclohexanone |

EXAMPLE 1

Preparation of the di(1,1-dimethylethyl)α,α'-diacetyl-β, β'-dioxo-1,4-benzenedipropionate Crosslinker (Ia)

In a 5 l, 3-necked, RB flask equipped with a mechanical stirrer, nitrogen sparge, 2 addition funnels, and temperature probe was placed aqueous NaOH (67.7 g in 200 mL distilled water). The mixture was cooled to 10° C. and t-butyl acetoacetate (t-BAA) (259.1 g, 1.64 mol) in 500 ml toluene was added dropwise. Additional toluene (ca. 300 mL) was added to help disperse the solid acetoacetate anion and the reaction cooled to 5° C. Terephthaloyl chloride (159.1 g, 0.78 mol) dispersed in 500 ml toluene was added dropwise at such a rate as to keep the reaction temperature below 10° C. After addition of approximately half of the terephthaloyl chloride solution, co-addition of NaOH (64.4 g in 100 ml distilled water) was started—again at such a rate as to keep the temperature below 10° C. The resulting reaction was stirred for 6 additional hours, acidified with HCl to a pH of 5 and allowed to stand overnight. The resulting organic layer was separated from the aqueous phase, extracted with brine, dried over anhydrous MgSO4, concentrated in vacuo and the resulting crystals collected and washed with heptane to yield 176.7 g (50.7% yield) white crystals, mp 94°–96° C. The mother liquor from this crystallization was seeded to produce 84.8 g additional product collected. Over-all yield 261.5 g (75.1%).

EXAMPLE 2

Preparation of di(1,1-dimethylethyl)-2,9-diacetyl-3,8-dioxodecanoate Crosslinker (Ih)

In an oven dried 2l, 3-necked, RB flask equipped with a nitrogen inlet, mechanical stirrer, addition funnel, and therometer was placed tBAA (118.65 g, 0.75 mol) in 600 ml THF. The mixture was cooled to −12° C. and NaH (62.0 g, 2.58 mol) [60% in mineral oil] added in portions, during which time the temperature rose to 6° C. The reaction was stirred for 1 hour at −8° C. to allow complete reaction of the NaH with the acetoacetate after which time adipyl chloride (65.89 g, 0.36 mol) dissolved in 120 ml THF was added dropwise. The addition was carried out at such a rate as to keep the reaction temperature below 3° C. The reaction was cooled to −10° C. and allowed to stir overnight. The reaction was acidified to a pH of 5.5 with 1M HCl at temperatures at or below −2° C. The resulting layers were separated and the aqueous phase extracted with toluene/EtOAc and concentrated in vacuo. In order to remove mineral oil and to separate the desired C alkylated product from traces of the O alkylated product, the organic layer was extracted with dilute NaOH, the aqueous layer reacidified with 1M HCl to a pH of 5, and extracted with $CH_2Cl_2$. The concentrated toluene/EtOAc layer, which contained unreacted acetoacetate and mineral oil was run through "wipe-film" still at 85° C. wall temperature and 0.1 mm Hg. The resulting material was extracted with methanol/heptane to remove the residual mineral oil and base extracted/acidified as described above. Base extraction conducted on the reaction mixture, layers once again separated.

EXAMPLE 3

Preparation of Terephthaloyl Bis(Acetic Acid T-Butyl Ester) (Compound IIa)

In a 3l, 3-necked, R.B. flask was placed t-BAA (87.01 g, 0.55 mol) in 150 ml toluene. To this was added NaOH (26.0 g in 50 ml $H_2O$) at a temperature of 5°–12° C. An additional 200 mL of toluene was added to assist in dispersion of the resultant enolate and the reaction stirred for 45 minutes. Solid terephthaloyl chloride (50.8 g, 0.25 mol) was added in portions during which time caustic was added to maintain a pH of ~12. The reaction was warmed to room temperature and the pH adjusted to ca. 9 with sat. aq. NH4Cl. The resultant mixture was treated with 40 ml NH4OH (12.4 g diluted to 50 ml with distilled water) and heated to 38° C. for 50 minutes. The reaction was cooled to 13° C. and acidified to a pH of ~4.5 with 3M acetic acid at such a rate as to keep the reaction temperature between 10°–13° C. The reaction was stirred ~10 minutes and the resulting layers separated. The organic layer was concentrated in vacuo and the residue crystallized from heptane to provide white crystals. The crude crystals were recrystallized with t-BuOH at 40° C., and the resulting solid product collected. The resulting solid obtained was the corresponding acid/acetoacetate. The mother liquor from this crystallization, which was shown by NMR analysis to contain the desired product and di(1,1-dimethyl-ethyl)α,α'-diacetyl-β,β'-dioxo-1,4-benzenedipropionate, was concentrated in vacuo and then recrystallized from hot heptane (70° C.) to yield additional product. Nice, white crystals collected. Crystals found by NMR to be desired product. Total yield 30.90 g (34.1%). (IIa) $^1H$ NMR: (enol) 12.64(s, 2H), 7.78(s, 2H), 5.62(s, 2H), 2.55 (s, 18H). (keto): 8.19(d, 2H), 3.95(s, 4H), 2.41 (s, 18H). 66/34 enol/keto. FDMS: MW found-362, actual-362. DEPT: (keto) 129.26(CH), 126.70(CH), 48.09($CH_2$), 28.42(CH3) (enol) 129.11(CH), 126.51(CH), 91.41(CH), 28.84(CH3). $^{13}C$: 192.36(C), 172.71, 168.96, 166.21(C), 139.58(C), 128.73(CH), 128.58(CH), 126.17(CH), 125.98(CH), 90.88(CH), 82.43(C), 82.25(C), 81.71(C), 47.56(CH2), 47.46(CH2), 28.31(CH3), 27.89(CH3).

EXAMPLES 3–6 AND COMPARATIVE EXAMPLES 1 AND 2.

Formulations were prepared from Compound Ia and various resins as follows:

| Example # | 4 | 5 | 6 | 7 | C1 | C2 |
|---|---|---|---|---|---|---|
| Ia | 14.5 | 7.8 | 11.6 | 11.6 | — | — |
| resin | (E)57.3 | (C)17.6 | (B)28.7 | (A)38.8 | (E)114.5 | (C)25 |
| solvent (ml) | 50[6] | 40[4] | 35[9] | 40[1] | 50[6] | 23 |
| TiO2 (R-900) | 47.9 | 16.8 | 26.9 | 33.6 | 76.3 | 16.7 |

The formulations were drawn down on phosphated steel to various thicknesses and cured at 120°–140° C. The properties of the resulting formulations are given in Table 4. The improved MEK rub resistance data for formulations 5–8 relative to C5 and C6 indicate that material 1a is effective in crosslinking the resin. Polyester controls for 7 and 8 remained tacky and would not cure.

EXAMPLES 8–12.

Formulations were prepared from compound Ib, (the ethyl analogue of Ia), and Ic, (the n-butyl analogue of Ia) with various resins as follows:

| Example # | 8 | 9 | 10 | 11 | 12 |
|---|---|---|---|---|---|
| Crosslinker | (Ib)13.2 | (Ib)7.0 | (Ib)10.8 | (Ic)8.7 | (Ic)7.0 |
| Resin | (A)37.2 | (D)21.6 | (E)48.7 | (A)21.6 | (E)27.8 |
| Solvent | 50[5] | 40[5] | 50[5] | 10[7] | 30[5] |
| TiO2(R-900) | 33.6 | 19.1 | 39.7 | 20.2 | 23.2 |

The formulations were drawn down and cured as before. The test results including cure conditions (Table 5) demonstrate that compounds 1b and 1c are effective crosslinkers for both the polyester and acrylic resins used. The control system for the polyester containing no crosslinker remained tacky when cured and the acrylic control system can be seen in comparative examples C1 and C2 above.

EXAMPLE 13–18.

Formulations were prepared from compounds Id and Ie from various resins as follows:

| Example # | 13 | 14 | 15 | 16 | 17 | 18 |
|---|---|---|---|---|---|---|
| Crosslinker | (Id)11.6 | (Id)8.0 | (Id)11.8 | (Ie)10.6 | (Ie)7.0 | (Ie)10.8 |
| Resin | (B)28.7 | (D)24.7 | (E)46.9 | (B)30.2 | (D)21.6 | (E)48.7 |
| Solvent | $53^7$ | $35^7$ | $65^2$ | $30^7$ | $25^7$ | $45^5$ |
| TiO2 | 26.9 | 21.8 | 39.3 | 26.9 | 19.1 | 40.1 |

The formulations were drawn down and cured as before. Test results and cure conditions can be seen in Table 6. Again it can be seen that incorporation of these crosslinkers in the formulations provide coatings with improved impact, chemical and solvent resistance relative to controls C1 and C2.

| | Examples 19–22. | | | |
|---|---|---|---|---|
| Example # | 19 | 20 | 21 | 22 |
| Crosslinker | (If) 7.0 | (If) 10.9 | (Ig) 6.5 | (Ig) 9.8 |
| Resin | (D) 24.0 | (E) 29.1 | (D) 26.1 | (E) 50.4 |
| Solvent | $55^4$ | $50^5$ | $30^7$ | $45^5$ |
| TiO2 | 20.7 | 39.6 | 21.8 | 40.1 |

The formulation prepared from crosslinker Ig would not cure between the temperature range of 130°–150° C. using resin B. Table 7 gives the test results and cure conditions for these crosslinkers. However, when used in polyester resins, these crosslinkers gave only a slight improvement over the polyester control systems. Improved reverse impact was noted over the aromatic crosslinkers previously tested when used in the acrylic resin investigated.

Also noted was the relative insolubility of the t-butyl analogue of this crosslinker. The material was tested in fifteen different solvents using a concentration of g crosslinking compound per 1.0 g solvent. The data (Table 3) shows that, at best, the compound was only slightly soluble in three of the solvents tested.

TABLE 3

| Solubility evaluation of compound If crosslinker | | |
|---|---|---|
| SOLVENT | GRAMS COMPOUND | SOLUBILITY |
| cyclohexanone | 0.209 | ss |

TABLE 3-continued

| Solubility evaluation of compound If crosslinker | | |
|---|---|---|
| SOLVENT | GRAMS COMPOUND | SOLUBILITY |
| DB | 0.200 | i |
| DE Acetate | 0.205 | i |
| DIBK | 0.204 | i |
| EB | 0.201 | i |
| EEP | 0.203 | i |
| EKTRSOLVE DM | 0.208 | i |
| EP | 0.200 | i |
| methyl amyl ketone | 0.206 | i |
| methyl ethyl ketone | 0.203 | ss |
| MIAK | 0.206 | vss |
| MIBK | 0.200 | vss |
| MPK | 0.206 | vss |
| xylenes (mixed) | 0.200 | ss |
| n-butanol | 0.202 | vss |

EXAMPLES 24–28

Formulations were prepared from compounds Ih and Ii from various resins as follows:

| Example # | 23 | 24 | 25 | 26 | 27 |
|---|---|---|---|---|---|
| Crosslinker | (Ih) 11.3 | (Ih) 7.0 | (Ih) 11.5 | (Ii) 7.5 | (Ii) 7.5 |
| Resin | (B) 29.0 | (D) 22.7 | (E) 47.5 | (D) 27.9 | (E) 35.8 |
| Solvent | $30^7$ | $25^7$ | $45^5$ | $25^7$ | $35^5$ |
| TiO2 | 26.9 | 19.8 | 39.4 | 23.6 | 28.9 |

Formulations were drawn down and cured as before. The test results, including cure conditions, shown in Table 8 demonstrate that these materials are effective crosslinking agents.

TABLE 4

| | Data for the terephthaloyl/tBAA crosslinkers (Ia) | | | | | | | |
|---|---|---|---|---|---|---|---|---|
| Example # | Cure Conditions (°C./min) | Film Thick. (mils) | Pencil Hardness (cut) | Impact Resist (for/rev) | MEK Double Rubs | Base Resist (cov/unc) | Acid Resist (cov/unc) | Iodine (5/30) (min) |
| 4 | 120/30 | 1.37 | 5 H | 80/<20 | >500 | 5/5 | 5/5 | 5/4 |
| 4 | 140/30 | 1.23 | 8 H | 60/<20 | >500 | 5/5 | 5/5 | 5/4 |
| 5 | 130/30 | — | 2 H | 160/160 | >400 | — | — | — |
| 6 | 130/30 | 1.20 | HB | 160/160 | 55 | — | — | — |

TABLE 4-continued

Data for the terephthaloyl/tBAA crosslinkers (Ia)

| Example # | Cure Conditions (°C./min) | Film Thick. (mils) | Pencil Hardness (cut) | Impact Resist (for/rev) | MEK Double Rubs | Base Resist (cov/unc) | Acid Resist (cov/unc) | Iodine (5/30) (min) |
|---|---|---|---|---|---|---|---|---|
| 7 | 130/30 | 1.49 | HB | 160/160 | >400 | 1/1 | 4/4 | 4/3 |
| c1 | 140/30 | 1.10 | 5 H | <20/<20 | 150 | 5/5 | 1/1 | 3/1 |
| c2 | 130/30 | — | <4 B | 160/160 | <4 | — | — | — |

TABLE 5

Data for the terephthaloyl/EAA and nBu crosslinkers (Ib, c)

| Example # | Cure Conditions (°C./min) | Film Thick. (mils) | Pencil Hardness (cut) | Impact Resist (for/rev) | MEK Double Rubs | Base Resist (cov/unc) | Acid Resist (cov/unc) | Iodine (5/30) (min) |
|---|---|---|---|---|---|---|---|---|
| 8 | 150/30 | 1.07 | H | 160/160 | >400 | 4/4 | 5/5 | 4/4 |
| 9 | 140/30 | — | 2 H | 160/120 | 161 | 5/5 | 5/5 | 5/4 |
| 10 | 140/30 | 0.91 | 8 H | 40/<20 | >400 | 5/5 | 4/4 | 5/5 |
| 11 | 140/30 | 1.39 | H | 160/160 | >400 | — | — | — |
| 12 | 170/30 | 0.80 | 8 H | 80/<20 | >400 | 4/4 | 5/5 | 5/5 |

TABLE 6

Data for the isophthaloyl/tBAA and EAA crosslinkers (Id, e)

| Example # | Cure Conditions (°C./min) | Film Thick. (mils) | Pencil Hardness (cut) | Impact Resist (for/rev) | MEK Double Rubs | Base Resist (cov/unc) | Acid Resist (cov/unc) | Iodine (5/30) (min) |
|---|---|---|---|---|---|---|---|---|
| 13 | 140/30 | 1.19 | H | 160/160 | 215 | — | — | — |
| 14 | 135/30 | — | 2 H | 160/80 | >400 | 5/5 | 5/5 | 5/4 |
| 15 | 160/30 | 0.72 | 8 H | 100/<20 | >400 | 4/4 | 5/5 | 5/5 |
| 16 | 140/30 | 1.45 | H | 160/160 | >400 | — | — | — |
| 17 | 140/30 | — | 2 H | 160/20 | >400 | 5/5 | 5/5 | 5/4 |
| 18 | 160/30 | 0.80 | 8 H | 80/<20 | >400 | 5/5 | 5/5 | 5/5 |

TABLE 7

Data for the succinyl/tBAA and EAA crosslinkers (If, g).

| Example # | Cure Conditions (°C./min) | Film Thick. (mils) | Pencil Hardness (cut) | Impact Resist (for/rev) | MEK Double Rubs | Base Resist (cov/unc) | Acid Resist (cov/unc) | Iodine (5/30) (min) |
|---|---|---|---|---|---|---|---|---|
| 19 | 130/30 | — | H | 160/160 | 15 | 1/1 | 5/5 | — |
| 20 | 160/30 | 0.89 | 8 H | 140/40 | >400 | 5/4 | 5/4 | 5/5 |
| 21 | 140/30 | — | H | 160/20 | 15 | 1/1 | 4/4 | 4/4 |
| 22 | 150/30 | 0.91 | 8 H | 100/<20 | >400 | 4/4 | 3/4 | 5/4 |

TABLE 8

Data for the adipyl/tBAA and EAA crosslinkers (Ih, i).

| Example # | Cure Conditions (°C./min) | Film Thick. (mils) | Pencil Hardness (cut) | Impact Resist (for/rev) | MEK Double Rubs | Base Resist (cov/unc) | Acid Resist (cov/unc) | Iodine (5/30) (min) |
|---|---|---|---|---|---|---|---|---|
| 23 | 130/30 | 1.03 | HB | 160/160 | >400 | — | — | — |
| 24 | 150/30 | — | H | 160/160 | >400 | 3/3 | 5/5 | 4/3 |
| 25 | 170/30 | 0.92 | 8 H | 140/<20 | >400 | 3/3 | 5/5 | 5/5 |
| 26 | 160/30 | — | F | 160/160 | 25 | 1/1 | 4/4 | 4/3 |
| 27 | 170/30 | 0.89 | BH | 160/<20 | >400 | 4/4 | 5/5 | 5/5 |

EXAMPLES 28 AND 29

Evaluation of Compound IIB In Coatings

The reaction of EAA with terephthaloyl chloride yielded terephthaloyl bis(acetic acid ethyl ester)(IIB). The formation of this compound resulted from stirring the reaction mixture, in basic solution, for an extended length of time (72 hrs) before acidification. The compound was isolated and found to be a surprisingly effective crosslinker. Formulations were prepared from the compound in both a polyester (example 28) and an acrylic (example 29) resin as follows:

| Example # | 28 | 29 |
|---|---|---|
| Crosslinker | 6.6 | 9.0 |
| Resin | (A) 23.6 | (E) 51.6 |
| Solvent | 54 ml[1] | 50 ml[1] |
| TiO2 | 20.2 | 40.4 |

Formulations were drawn down and both were cured at 150° C. for 30 minutes. The test results for the acrylic formulation included a hardness of 7H/8H, solvent resistance of >450 double rubs, impact resistance of 20/<20. Excellent Cleveland Humidity resistance (>1054 hrs). The polyester formulation gave a hardness of H/2H, impact resistance of 160 (forward and reverse). Panel only dulled on the Cleveland Humidity cabinet but withstood 1054 hours. Both formulations gave excellent acid and base resistance.

EXAMPLE 30

Evaluation of Terephthaloyl Bis(Acetic Acid t-butyl Ester)

The following formulation was prepared:

| Resin (E) | 19.87 g |
|---|---|
| Crosslinker 2a | 4.08 g |
| Solvent | 17 mL |
| FC-430 (20% soln) | 2.3 g |

| Terephthaloyl Bis(Acetic Acid T-Butyl Ester) | | | | | | |
|---|---|---|---|---|---|---|
| Cure Temp (°C./Min) | Pencil Hardness (Cut) | Film Thick. (Mils) | Impact Resist. (For/Rev) | MEK Double Rubs | NaOH (50%) (Cov/Unc) | $H_2SO_4$ (50%) (Cov/Unc) |
| 125/30 | 5 H | 1.34 | 30/<10 | >400 | 5/5 | 5/5 |
| 135/30 | 5 H | 1.56 | 30/<10 | >400 | 5/5 | 5/5 |
| 145/30 | 5 H | 1.37 | 40/<10 | >400 | 5/5 | 5/5 |

COMPARATIVE EXAMPLES 3–5

The following formulations were prepared from Resin E and Cymel 303, a commercial methylolated methoxy melamine crosslinker, at three catalyst levels:

| Example | C-3 | C-4 | C-5 |
|---|---|---|---|
| Resin (g) | 50.1 | 50.1 | 50.1 |
| Cymel 303 (g) | 17.15 | 17.17 | 17.15 |
| pTSA (40% soln) (g) | 0.01 | 0.03 | 0.06 |
| Solvent (mL) | 20 | 20 | 20 |
| FC 430 (30% soln) (g) | 0.50 | 0.50 | 0.50 |

This data shows the superior impact and acid resistance of the compounds of the present invention.

| Cure Temp (°C./min) | Pencil Hard. (cut) | Film Thick. (mils) | Impact Resist (for/rev) | MEK Double Rubs | NaOH Resist (cov/unc) | H$_2$SO$_4$ Resist (cov/unc) |
| --- | --- | --- | --- | --- | --- | --- |
| A) Example C3 (0.01% pTSA): | | | | | | |
| 125/30 | 5 H | 1.55 | 20/<10 | 275 | 5/5 | 0/0 |
| 135/30 | 5 H | 1.37 | 20/<10 | >400 | 5/5 | 0/0 |
| 145/30 | 6 H | 1.42 | 20/<10 | >400 | 5/5 | 0/0 |
| 155/30 | 8 H | 1.26 | 30/<10 | >400 | 5/5 | 0/0 |
| B) Example C4 (0.03% pTSA): | | | | | | |
| 125/30 | 6 H | 1.30 | 20/<10 | >400 | 5/5 | 0/0 |
| 135/30 | 6 H | 1.43 | 20/<10 | >400 | 5/5 | 0/0 |
| 145/30 | 7 H | 1.29 | 30/<10 | >400 | 5/5 | 0/0 |
| 155/30 | 8 H | 1.29 | 30/<10 | >400 | 5/5 | 0/0 |
| C) Example C5 (0.05% pTSA): | | | | | | |
| 125/30 | 6 H | 1.63 | 20/<10 | >400 | 5/5 | 0/0 |
| 135/30 | 6 H | 1.34 | 20/<10 | >400 | 5/5 | 0/0 |
| 145/30 | 6 H | 1.34 | 20/<10 | >400 | 5/5 | 0/0 |
| 155/30 | 7 H | 1.42 | 20/<10 | >400 | 5/5 | 0/0 |

We claim:

1. A thermosetting coating composition comprising
   (a) about 95 to about 55 weight percent, based on the total weight of (a) and (b), of one or more curable polymers;
   (b) about 5 to about 45 weight percent, based on the total weight of (a) and (b), of a compound of the formula

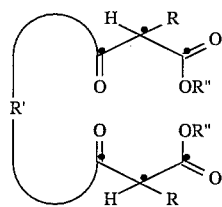

wherein R is a hydrogen atom, acetyl, or a group of the formula R'''C(O)—, wherein R''' is C$_2$–C$_6$ alkyl, C$_3$–C$_8$ cycloalkyl, or phenyl;
   R' is a divalent group selected from aryl, C$_2$–C$_{20}$ alkyl, or a group of the formula
   —CH$_2$-aryl—CH$_2$—; and
   R'' is C$_1$–C$_{10}$ alkyl; and
   (c) about 0 to about; 50 weight percent, based on the total weight of (a) and (b), of a solvent.

2. The composition of claim 1, wherein R' is a group of the formula —CH$_2$-phenyl-CH$_2$—.

3. The composition of claim 2, wherein the phenyl moiety is substitued in the 1 and 4 positions.

4. The composition of claim 2, wherein the phenyl moiety is substituted in the 1 and 3 positions.

5. The composition of claim 1, wherein R' is aryl.

6. The composition of claim 1, wherein the compound of component (b) has the formula

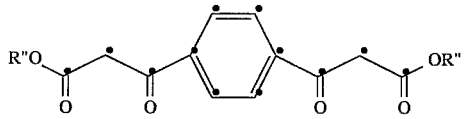

wherein R'' is as defined in claim 1.

7. The composition of claim 6, wherein R'' is ethyl or t-butyl.

* * * * *